United States Patent
Gregg et al.

(10) Patent No.: US 9,996,445 B2
(45) Date of Patent: *Jun. 12, 2018

(54) COMPUTER FLIGHT RECORDER WITH ACTIVE ERROR DETECTION

(71) Applicant: International Business Machines Corporation, Armonk, NY (US)

(72) Inventors: Leon E. Gregg, Rochester, MN (US); James L. Tilbury, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 253 days.

This patent is subject to a terminal disclaimer.

(21) Appl. No.: 14/158,146

(22) Filed: Jan. 17, 2014

(65) Prior Publication Data
US 2015/0205654 A1 Jul. 23, 2015

(51) Int. Cl.
G06F 11/00 (2006.01)
G06F 11/34 (2006.01)
G06F 11/07 (2006.01)

(52) U.S. Cl.
CPC ...... *G06F 11/3476* (2013.01); *G06F 11/0739* (2013.01); *G06F 11/0751* (2013.01); *G06F 11/3466* (2013.01)

(58) Field of Classification Search
CPC ............ G06F 11/3466; G06F 2201/86; G06F 11/3476; G06F 2209/481; B64F 5/0045; B64D 2045/0085; G05B 23/0245; H04L 41/147
See application file for complete search history.

(56) References Cited

U.S. PATENT DOCUMENTS

| | | | |
|---|---|---|---|
| 4,729,102 A * | 3/1988 | Miller, Jr. ............. | G07C 5/085 360/5 |
| 4,970,648 A | 11/1990 | Capots | |
| 5,239,468 A * | 8/1993 | Sewersky ............. | B64F 5/0045 701/14 |
| 5,889,784 A * | 3/1999 | Rogers ................... | G11B 19/04 714/704 |
| 5,892,437 A * | 4/1999 | Scheibe ................ | B60T 17/221 340/438 |
| 6,092,008 A * | 7/2000 | Bateman ............... | G07C 5/008 244/1 R |
| 6,278,913 B1 * | 8/2001 | Jiang .................... | G07C 5/0858 244/158.1 |
| 6,308,320 B1 * | 10/2001 | Burch ....................... | G06F 8/48 717/145 |
| 6,324,659 B1 * | 11/2001 | Pierro ................. | B61L 27/0094 714/47.3 |

(Continued)

FOREIGN PATENT DOCUMENTS

EP 1174796 A2 * 1/2002 ........... G06F 11/3466

OTHER PUBLICATIONS

Oracle JRockit, Flight Recorder Run Time Guide, Release R28, Oct. 2012.

(Continued)

*Primary Examiner* — Loan L. T. Truong
(74) *Attorney, Agent, or Firm* — Middleton Reutlinger (57) ABSTRACT

A method, apparatus and program product utilize a flight recorder having active error detection functionality to proactively detect errors in a computer or a sub-system or component thereof. The active error detection may be based on one or more trends detected in the trace data logged by the flight recorder and reflective of particular types of errors that may be present in a computer during operation, such that an error may be logged, and in some instances, an exception may be triggered.

17 Claims, 5 Drawing Sheets

(56) References Cited

U.S. PATENT DOCUMENTS

| | | | |
|---|---|---|---|
| 6,598,012 B1* | 7/2003 | Berry | G06F 11/3466 702/187 |
| 6,662,359 B1* | 12/2003 | Berry | G06F 11/3612 714/E11.211 |
| 6,862,696 B1* | 3/2005 | Voas | G06F 11/3466 714/38.11 |
| 7,281,112 B1 | 10/2007 | Gross et al. | |
| 7,509,537 B1* | 3/2009 | Jensen | G05B 23/0229 714/47.2 |
| 7,721,272 B2* | 5/2010 | Mockford | G06F 8/71 717/120 |
| 7,739,666 B2* | 6/2010 | Zhu | G06F 11/321 714/38.14 |
| 7,913,030 B2* | 3/2011 | Perry | G06F 11/348 711/170 |
| 8,146,057 B1* | 3/2012 | Michelsen | G06F 11/3672 717/124 |
| 8,473,928 B2* | 6/2013 | Park | G06F 11/3636 717/132 |
| 8,806,648 B2* | 8/2014 | Guy | G06F 21/577 713/189 |
| 8,819,496 B2* | 8/2014 | Ike | G06F 11/3636 714/25 |
| 8,868,772 B2 | 10/2014 | Major et al. | |
| 9,059,939 B2* | 6/2015 | Garimella | H04L 41/5054 |
| 9,102,417 B1* | 8/2015 | Young | A61B 5/18 |
| 9,129,057 B2* | 9/2015 | Sadasivam | G06F 11/3466 |
| 9,170,912 B1* | 10/2015 | Hu | G06F 11/3062 |
| 2001/0044705 A1* | 11/2001 | Vardi | G06F 11/3433 702/186 |
| 2002/0087949 A1 | 7/2002 | Golender et al. | |
| 2002/0103664 A1 | 8/2002 | Olsson et al. | |
| 2002/0173897 A1* | 11/2002 | Leamy | F02C 9/28 701/100 |
| 2003/0200462 A1 | 10/2003 | Munson | |
| 2004/0025083 A1* | 2/2004 | Nanja | G06F 11/3684 714/35 |
| 2004/0230874 A1* | 11/2004 | Prang | G06F 11/3466 714/39 |
| 2004/0250133 A1* | 12/2004 | Lim | G06F 21/554 726/23 |
| 2004/0260777 A1* | 12/2004 | Kolb | G07C 5/008 709/206 |
| 2005/0096873 A1* | 5/2005 | Klein | G01H 1/006 702/184 |
| 2005/0138484 A1* | 6/2005 | Moyer | G06F 11/3632 714/47.1 |
| 2005/0182750 A1 | 8/2005 | Krishna et al. | |
| 2005/0223366 A1 | 10/2005 | Smith et al. | |
| 2006/0092019 A1* | 5/2006 | Fallon | G08B 13/19656 340/541 |
| 2006/0126608 A1* | 6/2006 | Pereira | G05B 13/042 370/360 |
| 2006/0168471 A1* | 7/2006 | Schulstad | G06F 11/0727 714/6.11 |
| 2006/0200701 A1* | 9/2006 | Callender | G06F 11/3636 714/38.11 |
| 2006/0248419 A1* | 11/2006 | Colunga | G01R 31/318555 714/727 |
| 2006/0259830 A1 | 11/2006 | Blevin et al. | |
| 2007/0103340 A1* | 5/2007 | Baranov | G01C 23/00 340/968 |
| 2007/0136015 A1* | 6/2007 | Suzuki | G05B 23/0232 702/79 |
| 2007/0226697 A1* | 9/2007 | Barsness | G06F 11/3612 717/127 |
| 2008/0209525 A1* | 8/2008 | Ben-Shoshan | G06F 21/126 726/4 |
| 2008/0282236 A1* | 11/2008 | Neft | G06F 11/28 717/155 |
| 2008/0288931 A1* | 11/2008 | Kohli | G06F 8/34 717/157 |
| 2008/0300748 A1* | 12/2008 | Drummy | G01C 15/00 701/33.4 |
| 2008/0313504 A1 | 12/2008 | Wedel et al. | |
| 2009/0037887 A1* | 2/2009 | Chavan | G06F 11/3636 717/128 |
| 2009/0106521 A1* | 4/2009 | Whisnant | G06F 11/3495 711/170 |
| 2009/0164714 A1* | 6/2009 | Wideman | G06F 3/0608 711/111 |
| 2009/0217104 A1* | 8/2009 | Wilding | G06F 11/366 714/45 |
| 2010/0074492 A1* | 3/2010 | Shi | G01N 27/44717 382/129 |
| 2010/0080097 A1* | 4/2010 | Nakamae | G11B 20/18 369/47.15 |
| 2010/0152924 A1* | 6/2010 | Pandit | G01C 23/00 701/3 |
| 2010/0153069 A1 | 6/2010 | Giese et al. | |
| 2010/0174424 A1* | 7/2010 | Cornell | G01C 23/00 701/9 |
| 2010/0250057 A1 | 9/2010 | Steffler | |
| 2010/0318746 A1* | 12/2010 | Troxel | G06F 11/1438 711/141 |
| 2010/0318972 A1* | 12/2010 | Xu | G06F 9/3808 717/128 |
| 2011/0067008 A1* | 3/2011 | Srivastava | G06F 11/3466 717/128 |
| 2011/0112974 A1 | 5/2011 | Hinton et al. | |
| 2011/0144875 A1* | 6/2011 | Rado | B60T 8/1703 701/70 |
| 2011/0145838 A1* | 6/2011 | de Melo | G06F 11/3466 719/318 |
| 2011/0320873 A1* | 12/2011 | Abrams | G06F 11/366 714/37 |
| 2012/0036501 A1* | 2/2012 | Evensen | G06F 11/3636 717/128 |
| 2012/0096320 A1 | 4/2012 | Caffrey et al. | |
| 2012/0144246 A1* | 6/2012 | Dreyfoos | G06F 11/302 714/47.1 |
| 2012/0179646 A1* | 7/2012 | Hinton | G06F 17/30557 707/607 |
| 2012/0259793 A1* | 10/2012 | Umansky | G06Q 10/06 705/348 |
| 2013/0197739 A1* | 8/2013 | Gallagher | B64F 5/60 701/31.5 |
| 2013/0218823 A1* | 8/2013 | Ferrand | G06N 5/025 706/46 |
| 2013/0254742 A1 | 9/2013 | Hockings et al. | |
| 2014/0129058 A1* | 5/2014 | Elahi | G08G 5/0021 701/16 |
| 2014/0229056 A1* | 8/2014 | Catt | B64F 5/0045 701/31.9 |
| 2014/0289564 A1* | 9/2014 | Rugina | G06F 11/0712 714/38.1 |
| 2014/0331092 A1* | 11/2014 | Taylor | G06F 11/0787 714/48 |
| 2014/0365649 A1* | 12/2014 | Giese | G06F 11/3409 709/224 |
| 2015/0186536 A1* | 7/2015 | Bosworth | G06F 17/30867 707/754 |
| 2015/0193226 A1 | 7/2015 | Michelsen | |
| 2015/0205651 A1* | 7/2015 | Gregg | G06F 11/3476 714/45 |
| 2015/0324501 A1* | 11/2015 | Desell | G01C 23/00 703/2 |
| 2016/0036513 A1* | 2/2016 | Klippert | H04W 4/001 455/15 |
| 2016/0179799 A1 | 6/2016 | Raman et al. | |
| 2016/0217159 A1 | 7/2016 | Dahan et al. | |
| 2016/0224459 A1 | 8/2016 | Liu et al. | |

OTHER PUBLICATIONS

IBM IPCOM000010140D, "Hardware Improvements for a Firmware Initiated Flight Recorder," An IP.Com Prior Art Database Technical Disclosure, Oct. 25, 2002.

(56) References Cited

OTHER PUBLICATIONS

U.S. Patent and Trademark Office, Office Action issued in related U.S. Appl. No. 14/458,881 dated Apr. 13, 2016.
U.S. Patent and Trademark Office, Final Office Action issued in related U.S. Appl. No. 14/458,881 dated Oct. 7, 2016.
U.S. Patent and Trademark Office, Office Action issued in related U.S. Appl. No. 14/458,881 dated Apr. 6, 2017.
Truong, Loan (Examiner), U.S. Patent and Trademark Office, Notice of Allowance issued in related U.S. Appl. No. 14/458,881 dated Oct. 25, 2017.

* cited by examiner

COMPUTER FLIGHT RECORDER WITH ACTIVE ERROR DETECTION

FIELD OF THE INVENTION

The invention is generally related to computers and computer software, and in particular, to error detection in a computer.

BACKGROUND OF THE INVENTION

As computers become more complex and powerful, monitoring the overall "health" of a computer becomes a greater concern, particularly when problems occur and the causes of those problems need to be identified and resolved. For this reason, a number of techniques have been developed for collecting information, often referred to as performance metrics, relating to the state of a computer during its operation.

For example, one manner of collecting performance metrics relies upon counters and/or timers that are instrumented into a running system and that provide real-time feedback about the number, type and performance of various processes running in a computer and the resources being utilized by those processes. Counters and timers, however, are usually directed to collecting specific pieces of information, and do not provide a comprehensive set of information about the overall performance of a computer or any of its components. Thus, while counters and timers can be useful in identifying problem areas that need to be investigated, they typically do not provide the level of detail needed to solve most problems.

For this reason, many computers often rely on a system tracing facility, which records a historic collection of "events" that occur within a computer. These events are usually implemented by explicit calls from the component software to the system tracing facility, and a user often has the ability to select only certain types of events to trace. Often the amount of data collected by a system tracing facility is exceptionally large, and requires that the events recorded by the system tracing facility be analyzed after the collection is ended, often using relatively sophisticated database query and analysis techniques. Due to the complexity and volume of data, the total elapsed time required from starting a trace to the generation of detailed reports can be significant, e.g., a number of hours, which precludes any generation of results in near real-time.

Another technique that may be used for gathering performance metrics relies on "flight recorders." A flight recorder is typically a simplified, high performance version of a system tracing facility that is dedicated to a specific software component in a computer. The simplified nature typically means that a flight recorder is much more likely to be able to provide near real-time information on a problem.

A flight recorder, as compared to a system tracing facility, generally collects information regarding a relatively small number of events, and often the events are at a comparatively higher level in the hierarchy of the computer system. For example, a component may be instrumented to call the flight recorder at exit and/or entry points of routines, at the beginning and/or completion of certain operations, etc. In addition, the data collected by a flight recorder, which is typically organized into "trace points," is typically buffered only on a temporary basis, and is not permanently stored. Control of a flight recorder is typically implemented by the component being monitored, and much in the same manner as an aircraft flight recorder, a flight recorder logs trace points on a continuous basis such that, after a problem is detected, the flight recorder's log can be reviewed to assist in reconstructing the problem and the potential cause(s) thereof.

The general manner in which a flight recorder is typically used is as follows. When it is projected that a performance problem is likely to occur in the near future (e.g., minutes or hours), flight recorders for any suspected components may be started. Then, when a problem in component X is detected (e.g. from counter and/or timer metrics), the component X flight recorder data may be extracted and analyzed to decode the problem. This extracted data is available in near real-time and can be used to take action and drive other decisions in the process of problem determination. Moreover, the flight recorders often continue to run, thus enabling extraction and analysis of data to be repeated as necessary.

In other instances, flight recorders may be configured to run anytime a computer is operational, thereby providing an on-going log of events that can be evaluated at a later time to reconstruct any problems encountered during operation.

Conventional flight recorders, however, are passive in nature, and are generally limited to logging trace points that are only later analyzed in the event of a problem. The actual detection of errors as they occur, on the other hand, is beyond the scope of conventional flight recorders. Real-time error detection may be left to other logic in a computer, such as watchdog timers and exception handlers that halt execution when problems are detected. Otherwise, computers can become non-responsive and require a reboot, at which time the log of a flight recorder can be analyzed to reconstruct the error.

In some instances, however, real-time error detection may be slow to detect errors in an operational computer or one of its components. For example, in a complex multi-user computer such as a server, some of the sub-systems in such a computer may experience errors that are not readily detected by conventional error detection techniques. As but one example, a removable media sub-system that provides an interface for removable storage devices, e.g., for the purposes of system backups, may experience an error and become non-responsive, but due to the relatively low frequency of use, the error may not be detected for hours, typically when another request is issued when attempting to access the sub-system.

Therefore, a substantial need continues to exist in the art for a manner of improving error detection in a computer and/or a computer's sub-systems or components.

SUMMARY OF THE INVENTION

The invention addresses these and other problems associated with the prior art by providing a method, apparatus and program product that utilize a flight recorder having active error detection functionality to proactively detect errors in a computer or a sub-system or component thereof. The active error detection may be based on one or more trends detected in the trace data logged by the flight recorder and reflective of particular types of errors that may be present in a computer during operation, such that an error may be logged, and in some instances, an exception may be triggered.

Therefore, consistent with one aspect of the invention, errors in a computer may be detected by logging trace data in a flight recorder during operational use of the computer, detecting a trend in the logged trace data with the flight recorder, and determining an error with the flight recorder based on the detected trend in the logged trace data.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize a flight recorder with active error detection functionality to proactively detect errors in a computer or a sub-system or component thereof. The active error detection may be based on one or more trends detected in the trace data logged by the flight recorder and reflective of particular types of errors that may be present in a computer during operation. For example, trace data may be logged in the form of trace points, which may each include one or more of a caller identifier, an operation identifier and a trace point identifier, and a flight recorder consistent with the invention may look for repeated consecutive trace points sharing the same caller identifier, operation identifier and/or trace point identifier, as any such repeated consecutive trace points may be indicative of program code that is unable to exit from a loop, a routine or a function and is thus potentially executing in an undesirable manner.

A flight recorder in this regard generally refers to a program entity resident in a computer or other programmable electronic device, and that logs system data, referred to herein as trace data, during operation of the computer. Trace data is logged by issuing calls or requests to the flight recorder to cause the flight recorder to store trace points in the flight recorder log. Requests or calls are instrumented into executable program code in the computer such that when specific points in the executable program code are reached, the flight recorder will log those occurrences, as well as additional data that may be useful for reconstructing a problem that may be encountered during operation of the computer, e.g., the identity of the entity calling the flight recorder, an operation with which the calling entity is associated, a unique identifier for the specific location in the entity making the call, additional contextual data that may be useful in later reconstructing a problem (e.g., parameters passed to functions, current values of variables, current computer state data, etc.), etc. The types of occurrences that are generally logged include but are not limited to entry and/or exit points for routines, methods, functions and/or objects, execution of error handling or other specific code sections, etc.

A flight recorder may log trace data for an entire computer, or alternatively, may be specifically configured to log trace data for specific components, sub-systems or other entities within a computer. In addition, a flight recorder may be used during operational use of a computer, component, sub-system or other entity, as well as during debugging or testing of a computer, component, sub-system or other entity under development.

A flight recorder consistent with the invention may implement active error detection by monitoring for one or more trends in the logged trace data. A trend, in this regard, may be associated with a particular pattern detected in a set of logged trace points. For example, a trend may be associated with a set of consecutive trace points that meet a particular trend criterion, e.g., a set of consecutive trace points having the same trace point identifier, a set of consecutive trace points having the same operation (e.g., as defined by an operation identifier, major operation identifier, minor operation identifier, etc.), a set of consecutive trace points associated with the same entity (e.g., as defined by a caller identifier, function identifier, entity identifier, component identifier, task identifier, etc.), etc.

In some embodiments, a detected trend may be identified as an error based upon the trend meeting an error criterion. For example, in one embodiment, the error criterion may be based on the number of logged trace points that meet a trend criterion meeting an error threshold value. For example, where the trend criterion relates to consecutive trace points associated with the same trace point identifier, one suitable error criterion would be the number of consecutive trace points exceeding an error threshold value.

In some embodiments, a flight recorder, upon determining an error, may log the error along with the other trace data to assist with reconstructing a problem. In other embodiments, a flight recorder may take a more active role in addressing the error. For example, a flight recorder may assert an exception or interrupt to initiate execution of error handling code in a computer. In some embodiments, for example, if an error is determined in connection with handling a work request in an instrumented component, the work request may be terminated.

Other variations and modifications will be apparent to one of ordinary skill in the art. Therefore, the invention is not limited to the specific implementations discussed herein.

Hardware and Software Environment

Figure 1:
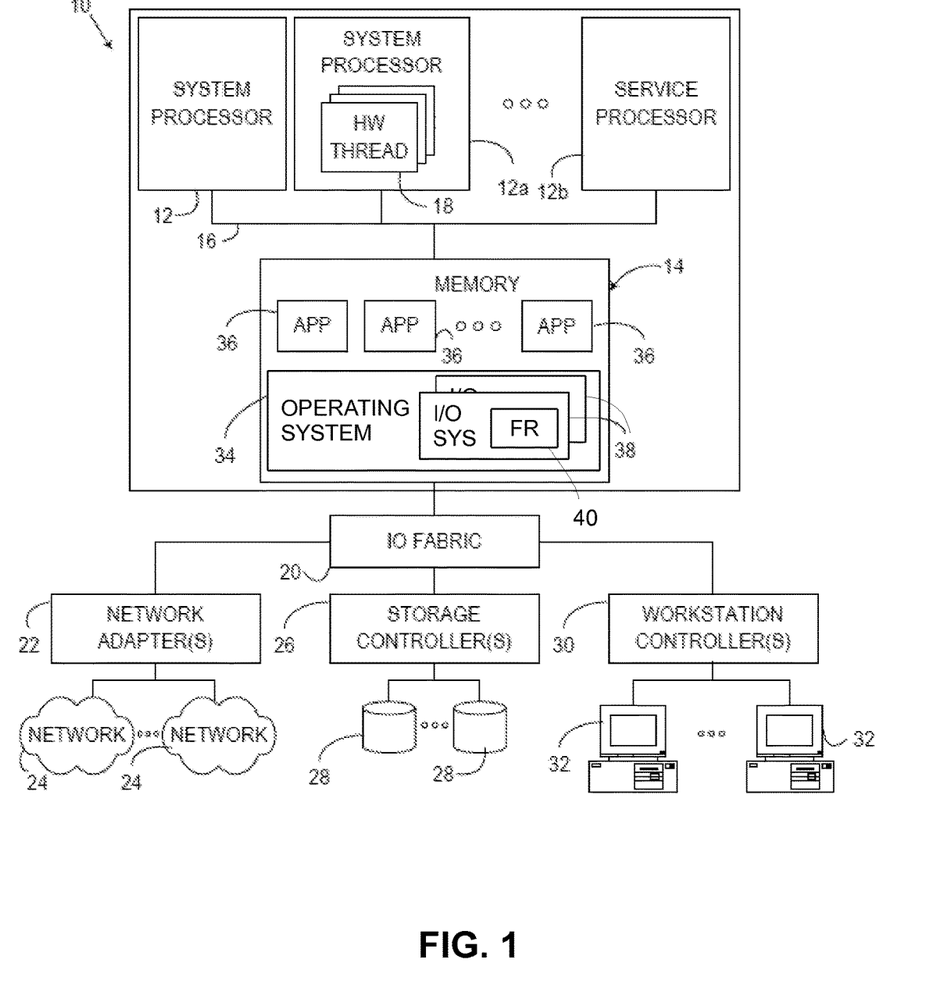
FIG. 1 is a block diagram of the principal hardware components in a computer system suitable for implementing a flight recorder with active error detection consistent with the invention.

Turning now to the Drawings, wherein like numbers denote like parts throughout the several views, FIG. 1 illustrates the principal hardware components in an apparatus 10 capable of implementing a flight recorder with active error detection consistent with the invention. Apparatus 10 is illustrated as a multi-user computer, and may generically represent, for example, any of a number of multi-user computers such as a network server, a midrange computer, a mainframe computer, etc., e.g., an IBM Power Systems computer system. However, it should be appreciated that the invention may be implemented in other computers and data processing systems, e.g., in single-user computers such as workstations, desktop computers, portable computers, mobile computers, and the like, in other programmable electronic devices (e.g., incorporating embedded controllers and the like), or in a high performance computer such as a massively parallel computer or supercomputer. Apparatus 10 will hereinafter also be referred to as a "computer," although it should be appreciated the term "apparatus" may also include other suitable programmable electronic devices consistent with the invention.

Computer 10 generally includes a central processing unit (CPU) including at least one hardware-based processor 12 coupled to a memory 14 via a bus 16. Each processor 12 may be implemented as a single threaded processor, or as a multithreaded processor, such as with processor 12a, which is shown incorporating a plurality of hardware threads 18. In addition, one or more of processors 12 (e.g., processor 12b) may be implemented as a service processor, which is used to run specialized firmware code to manage system boot up (also referred to as system initialization or initial program load (IPL)), and to otherwise monitor, diagnose and configure system hardware.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via an IO fabric 20, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

Memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device or on another computer coupled to computer 10.

It will also be appreciated that computer 10 may incorporate other architectures, e.g., a NUMA architecture where processors and/or memory devices are arranged into nodes coupled to one another via a high speed network.

Computer 10 operates under the control of an operating system 34 and executes or otherwise relies upon various computer software applications, components, programs, objects, modules, data structures, etc., as will be described in greater detail below (e.g., applications 36). In addition, operating system 34 may include various components, e.g., one or more input/output (I/O) systems 38, each of which may include an flight recorder (FR) 40 including active error detection consistent with the invention. Moreover, various applications, components, programs, objects, modules, etc. may also execute on one or more processors in another computer coupled to computer 10 via network, e.g., in a distributed or client-server computing environment, whereby the processing required to implement the functions of a computer program may be allocated to multiple computers over a network. In addition, computer 10 may be implemented as a logically-partitioned computer, whereby multiple partitions, each with a separate operating system, are resident in the computer.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include tangible, recordable type media such as volatile and non-volatile memory devices (e.g., memory 14), floppy and other removable disks, hard disk drives, magnetic tape, and optical disks (e.g., CD-ROMs, DVDs, etc.), among others.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIG. 1 is not intended to limit the present invention. Indeed, those skilled in the art will recognize that other alternative hardware and/or software environments may be used without departing from the scope of the invention.

Flight Recorder with Active Error Detection

Figure 2:
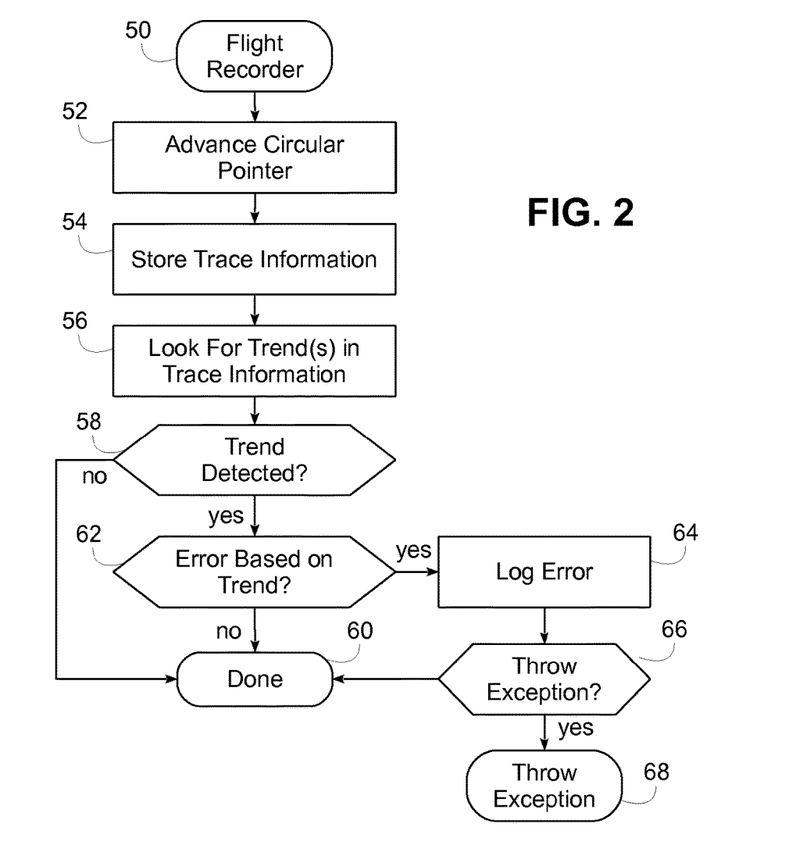
FIG. 2 is a flowchart illustrating an example sequence of operations for detecting an error with a flight recorder from the computer system of FIG. 1.

Now turning to FIG. 2, an example flight recorder routine 50 is illustrated. Routine 50 may be called, for example, by an instrumented component whenever it is desired to log trace data associated with an event during execution of the component. Upon initiation, routine 50 begins in block 52 by advancing a circular pointer for a log in the flight recorder. In this embodiment, a circular pointer is used such that the log may be implemented in a fixed size buffer that maintains the last N logged trace points. As additional trace points are logged, the oldest trace points are overwritten. It will be appreciated however, that a log need not be implemented with a fixed size.

Figure 3:
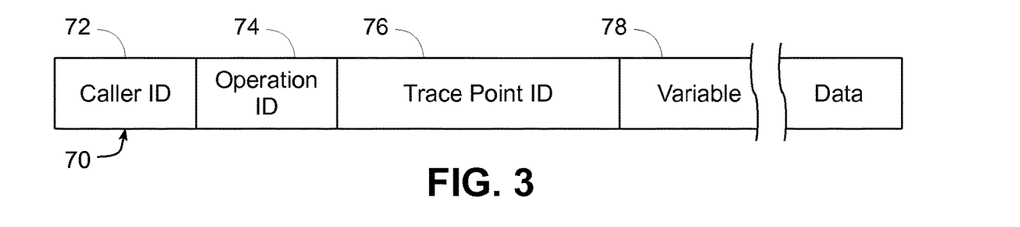
FIG. 3 is a block diagram of an example trace point.

Next, block 54 stores trace information, e.g., a trace point, based upon data provided with the call to routine 50 and/or other data associated with the state of the component when routine 50 is called. For example, as shown in FIG. 3, it may be desirable to store a trace point 70 with a plurality of fields, including a caller identifier field 72, an operation identifier field 74, a trace point identifier field 76, and optional variable data 78. In one embodiment, for example, fields 72 and 74 may each be one byte in size, field 76 may be two bytes in size, and field 78 may be four bytes in size, such that each trace point is 8 bytes in size. Fields 72-78 may be provided as parameters included with the call to the flight recorder, and thus provided by the instrumented component. Caller ID field 72 may specify an identity of a particular task, entity, or caller to effectively answer the question of who or what entity is associated with the trace point. Operation identifier field 74 may specify an operation identifier, and may include multiple identifiers such as multiple levels of identifiers, or major and minor identifiers. Field 74 may therefore be used to partition the trace points by the operations being performed by an instrumented component, e.g., the work requests being handled thereby. Trace point identifier field 76 may specify a trace point identifier that is unique to the call in the instrumented component, thereby enabling the specific point in the executable code with which the trace point is associated. Variable data field 78 may include any state data, such as current values of parameters or variables existing in the instrumented component when the trace point is logged. Field 78 may therefore be tailored to provide any type of data that may be useful in reconstructing a problem in the component. It will be appreciated that other data structures may be used for trace points, and thus the invention is not limited to the particular trace point format illustrated in FIG. 3.

Returning to FIG. 2, after the trace information is stored in block 54, the flight recorder attempts to identify one or more trends in the trace information that are potentially indicative of an error in the component (block 56). Block 58 then determines whether a trend has been detected, and if not, passes control to block 60 to terminate routine 50 and return to the calling code in the instrumented component.

However, if a trend is detected, block 62 then determines whether the trend is indicative of an error. If not, control passes to block 60 to terminate the routine. Otherwise, control passes to block 64 to log the error, e.g., to identify that a potential error has been encountered. In addition, in some embodiments, the type of error, if discernable, may also be logged, as well as any other contextual data that may be useful in reconstructing the problem.

Next, control passes to block 66 to determine whether to throw an exception. For example, it may be desirable to enable active intervention by a flight recorder in some circumstances, e.g., based on a user-configurable setting, or based on the type of error (such that certain types of errors cause an exception to be asserted while other types do not). In other embodiments, no active intervention may be performed, while in still other embodiments, active intervention may always be performed.

If no active intervention is to be performed, block 66 returns control to block 60 to terminate the routine. Otherwise, block 66 passes control to block 68 to throw or assert an exception, thereby invoking error handling functionality in the computer to address the error. As one example, asserting an exception may terminate handling of a work request, along with presenting an error to a user associated with the work request.

The manner in which a trend may be detected and an error may be determined may vary in different embodiments, and multiple trends/errors may be detected and/or determined in a flight recorder consistent with the invention. For the sake of simplifying the discussion, FIGS. 4-6 separately describe three example trends that may be detected in a flight recorder utilized in connection with a removable media system in a multi-user computer.

Figure 4:
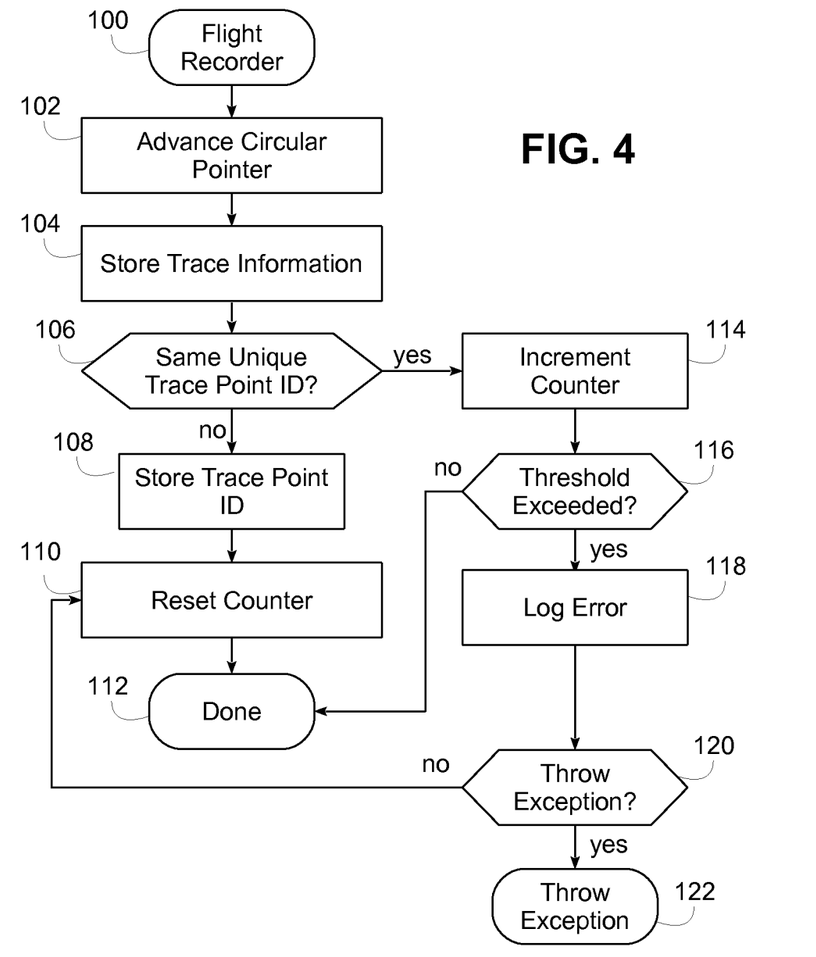
FIG. 4 is a flowchart illustrating an example sequence of operations for detecting consecutive trace points with the same trace point identifier with a flight recorder from the computer system of FIG. 1.

FIG. 4, for example, illustrates a flight recorder routine 100 that may be utilized to detect a trend in the trace data related to consecutive trace points having the same trace point identifier. In one embodiment, for example, each trace point call instrumented into a component may be assigned a unique trace point identifier, such that if multiple consecutive trace points are logged with the same trace point identifier, the trace data indicates that the instrumented component is potentially stuck in a loop, particularly if the number of consecutive occurrences is well beyond an expected number of iterations.

Routine 100 utilizes a counter that is used to count the number of consecutive occurrences of a trace point having the same trace point identifier, as well as a current trace point identifier variable that is used to store the current (most recent) trace point identifier logged for the flight recorder. As such, the trend criterion in this embodiment is based on the trace point identifier of a new trace point being identical to that of a prior trace point, while the error criterion is the counter representative of the number of consecutive trace points having the same trace point identifier meeting or exceeding a particular threshold value.

Routine 100 begins in block 102 by advancing the circular pointer for the flight recorder log. Next, in block 104, trace information, e.g., a trace point, is stored or logged. Next, block 106 determines whether the new trace point meets a trend criterion by determining whether the new trace point has the same trace point identifier as is stored in the current trace point identifier variable. If not, the trace point identifier of the new trace point is stored in the current trace point identifier variable (block 108), the counter is reset (block 110), and routine 100 terminates (block 112).

If, however, the trace point identifier is the same, block 106 passes control to block 114 to increment the counter. Block 116 then determines whether the error criterion is met by determining whether the counter exceeds a threshold count indicative of a potential error. If not, control returns to block 112 to terminate the routine. Otherwise, block 116 passes control to block 118 to log the error. Block 120 then determines whether an exception should be asserted or thrown for the error (e.g., based on type of error or system configuration), and if not, passes control to block 110 to reset the counter and terminate the routine (block 112). If an exception should be thrown, however, block 120 passes control to block 122, and routine 100 is complete.

Figure 5:
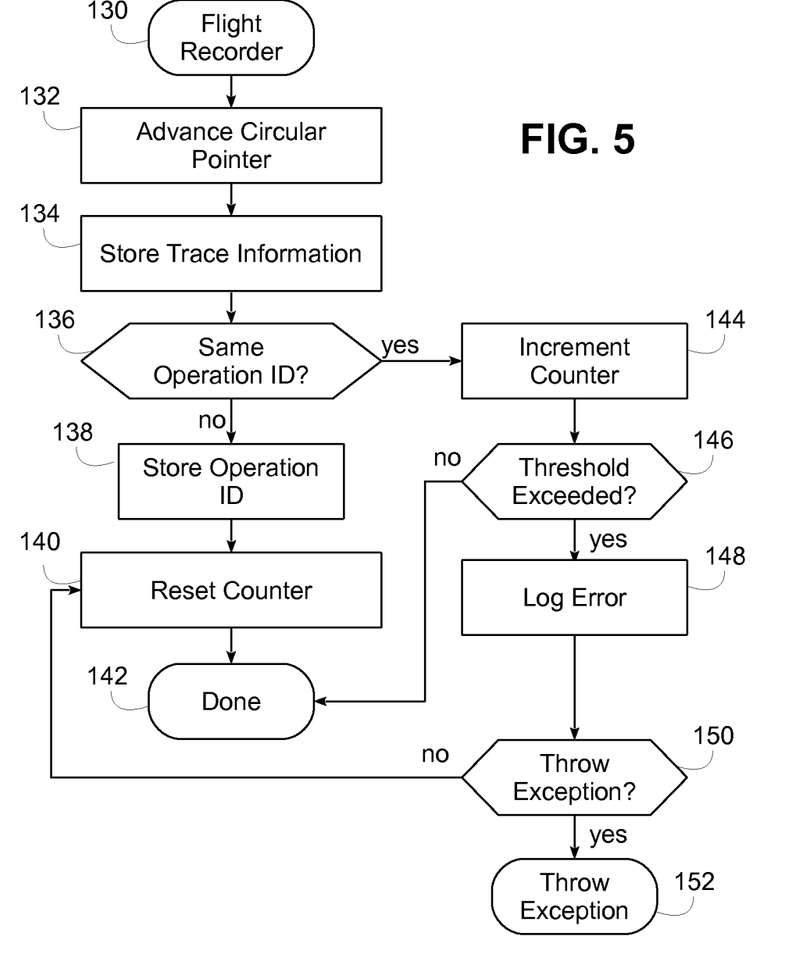
FIG. 5 is a flowchart illustrating an example sequence of operations for detecting consecutive trace points for the same operation with a flight recorder from the computer system of FIG. 1.

FIG. 5 illustrates another flight recorder routine 130 that may be utilized to detect a trend in the trace data related to consecutive trace points for the same operation. In one embodiment, for example, each trace point call instrumented into a component may be associated with an operation identifier, such that if multiple consecutive trace points are logged with the same operation identifier, the trace data indicates that the instrumented component is potentially stuck working on the same operation. In some embodiments, operation identifiers may be multi-level, and include, for example, major and minor operation identifiers, or alternatively, three or more levels of identifiers, to enable sub-operations within an operation to be separately identified. In still other embodiments, operation identifiers may be assigned sequentially to operations such that, rather than identifying a particular type of operation, operation identifiers may be used to identify, which, among a plurality of operations sequentially processed by a component, caused the error. In some embodiments, for example, an operation may be associated with a work request issued by a user or client of the component, such that a detected error may be used to terminate a work request.

Routine 130 utilizes a counter that is used to count the number of consecutive occurrences of a trace point having the same operation identifier, as well as a current operation identifier variable that is used to store the current (most recent) operation identifier logged for the flight recorder. As such, the trend criterion in this embodiment is based on the operation identifier of a new trace point being identical to that of a prior trace point, while the error criterion is the counter representative of the number of consecutive trace points having the same operation identifier meeting or exceeding a particular threshold value.

It will also be appreciated that whether a trace point has the same operation identifier as a prior trace point may vary in different embodiments. For example, where a multi-level operation identifier is used, a match may require all levels of an operation identifier to match, or may only require a subset of levels to match, e.g., where major and minor operation identifiers are used, a trend criterion may require both major and minor operation identifiers to match, or may require only a match for the major operation identifier or the minor operation identifier.

Routine 130 begins in block 132 by advancing the circular pointer for the flight recorder log. Next, in block 134, trace information, e.g., a trace point, is stored or logged. Next, block 136 determines whether the new trace point meets a trend criterion by determining whether the new trace point has the same operation identifier as is stored in the current operation identifier variable. If not, the operation identifier of the new trace point is stored in the current operation identifier variable (block 138), the counter is reset (block 140), and routine 130 terminates (block 142).

If, however, the operation identifier is the same, block 136 passes control to block 144 to increment the counter. Block 146 then determines whether the error criterion is met by determining whether the counter exceeds a threshold count indicative of a potential error. If not, control returns to block 142 to terminate the routine. Otherwise, block 146 passes control to block 148 to log the error. Block 150 then determines whether an exception should be asserted or thrown for the error (e.g., based on type of error or system configuration), and if not, passes control to block 140 to reset the counter and terminate the routine (block 142). If an exception should be thrown, however, block 150 passes control to block 152, and routine 130 is complete.

Figure 6:
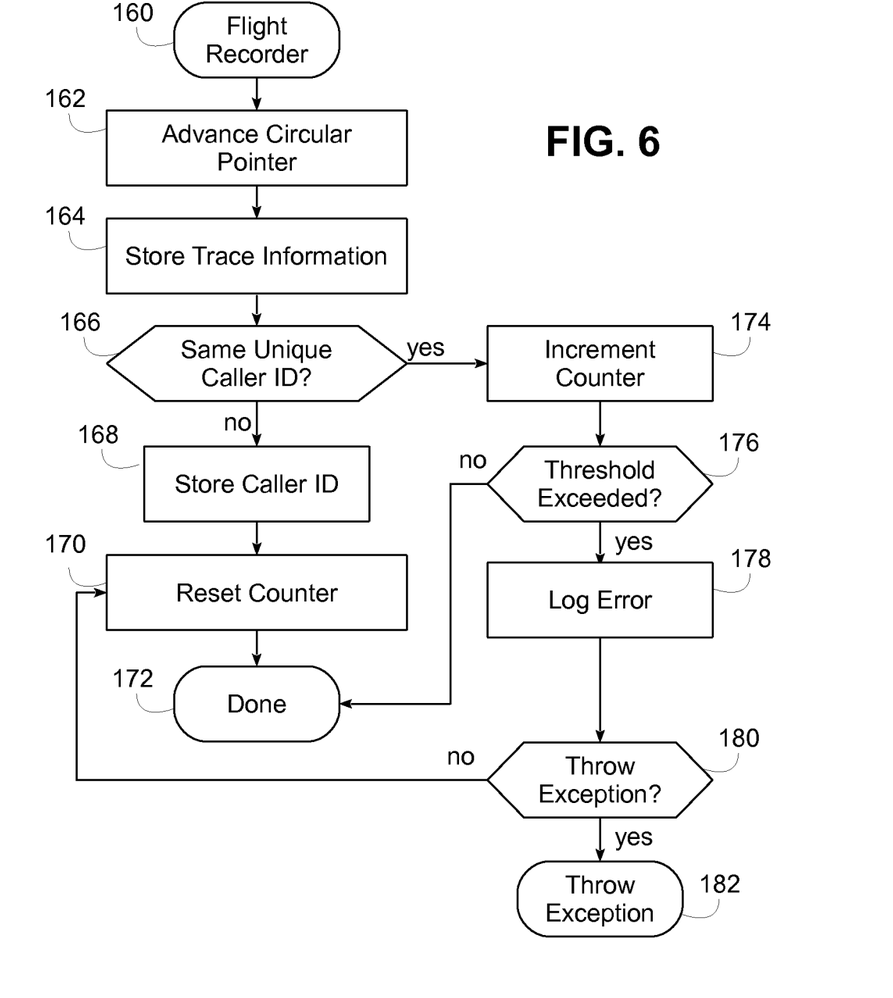
FIG. 6 is a flowchart illustrating an example sequence of operations for detecting consecutive trace points associated with the same entity with a flight recorder from the computer system of FIG. 1.

FIG. 6 illustrates another flight recorder routine 160 that may be utilized to detect a trend in the trace data related to consecutive trace points associated with the same entity, e.g., the same task, caller or other entity in a program, i.e., "who" logged the trace point. In one embodiment, for example, each trace point call instrumented into a component may be associated with a caller identifier, such that if multiple consecutive trace points are logged with the same caller identifier, the trace data indicates that the instrumented component is potentially stuck working on operations for the same caller, and that, for example, a task switch has never occurred and other tasks may be stalled waiting on the component.

Routine 160 utilizes a counter that is used to count the number of consecutive occurrences of a trace point having the same caller identifier, as well as a current caller identifier variable that is used to store the current (most recent) caller identifier logged for the flight recorder. As such, the trend criterion in this embodiment is based on the caller identifier of a new trace point being identical to that of a prior trace point, while the error criterion is the counter representative of the number of consecutive trace points having the same caller identifier meeting or exceeding a particular threshold value.

Routine 160 begins in block 162 by advancing the circular pointer for the flight recorder log. Next, in block 164, trace information, e.g., a trace point, is stored or logged. Next, block 166 determines whether the new trace point meets a trend criterion by determining whether the new trace point has the same caller identifier as is stored in the current caller identifier variable. If not, the caller identifier of the new trace point is stored in the current caller identifier variable (block 168), the counter is reset (block 170), and routine 160 terminates (block 172).

If, however, the caller identifier is the same, block 166 passes control to block 174 to increment the counter. Block 176 then determines whether the error criterion is met by determining whether the counter exceeds a threshold count indicative of a potential error. If not, control returns to block 172 to terminate the routine. Otherwise, block 176 passes control to block 178 to log the error. Block 180 then determines whether an exception should be asserted or thrown for the error (e.g., based on type of error or system configuration), and if not, passes control to block 170 to reset the counter and terminate the routine (block 172). If an exception should be thrown, however, block 180 passes control to block 182, and routine 160 is complete.

Now returning to FIG. 1, in one example embodiment, a flight recorder 40 may be associated with an I/O system 38, e.g., a removable media system. Trace points may be associated with particular operations of the removable media system, e.g., open operations, read operations, write operations, close operations, etc. The operations may be associated with operation identifiers that are sequentially numbered, and that represent work requests issued to the removable media system. For example, operation identifiers may be represented by a one byte value that is incremented as each operation is initiated by the removable media system.

Trace points may also be associated with particular caller identifiers associated with the particular components of the removable media system. For example, a one byte value may be used to distinguish various components of the removable media system, e.g., a command component, a storage layer component, a volume table manager component, a device state component, etc.

When a call to a flight recorder for a removable media system is performed, the flight recorder will therefore know the caller, and the data to be recorded. Knowledge of the caller may be used to monitor for some types of error situations. For a specific operating system and code instance a threshold may be set to determine an error situation with a high probability of confirmation. For example, in a removable media system a flood of calls from a user work request without any activity from a hardware interface has a high likelihood of an error, quite probably some logical loop in the processing of the work request.

Another type of error monitoring by such a flight recorder does not require any knowledge of internal objects or groups of code, and based on trace point identifier requires only a check for one flight recorder point being hit over, and over, and over. If a threshold is reached the flight recorder can indicate a strong suspicion that there is an infinite loop.

In all of these cases the flight recorder code may place data in the error log indicating that an error has been detected. But in some instances, additional work may be performed to actively deal with the situation. In some instances the flight recorder can assert an exception or interrupt. Standard exception handling code may then be activated to terminate processing of the current work. Depending on the situation it is also possible to be less drastic and code to abnormally terminate the current work may be invoked.

It will be appreciated that for both of the specific error situations described above, the error would likely still be detected by other, higher level error handling functionality in the computer system, but this error detection would typically be detected significantly later, e.g., based on some user timeout. In the case of a removable media system, the timeout may not be encountered for hours, so an advantage does exist for the earlier detection provided by a flight recorder configured in the manner described herein. But the earlier detection is not the only advantage. When there is a timeout condition, this does end the user's job or free up the interactive terminal, but in many cases this does nothing to change the condition of the device manager that has the underlying problem. The user will likely have to manually vary-off the device and then do a vary-on. The user may have to go to the service manager and reset and reboot or re-IPL (Initial Program Load) an I/O processor, which may have an added undesirable problem in that the reboot may affect other devices attached to the I/O processor. With the use of a flight recorder configured as described herein, when a user's work request is terminated when an error is detected, there may be no need for any additional manual recovery. The one user request or job may be ended abnormally, but the device manager may remain active and ready to process work. Also, if the less subtle approach of forcing an exception is used, the device manager may be placed in an error state, but the only manual recovery may be limited to a vary-off and vary-on of the one device.

Therefore, it can be seen that embodiments consistent with the invention provide active error detection and/or handling capability within a flight recorder. Various modifications may be to the illustrated embodiments consistent with the invention. For example, it will be appreciated that other aspects of trace information may be monitored for trends indicative of potential errors. In addition, it will be appreciated that trends associated with patterns other than consecutive strings of trace points having the same trace data may be used, e.g., where certain sequences of trace points are detected. In one embodiment, for example, a pattern of two alternating types of trace points may be a trend that is indicative of a potential error. Other modifications will be apparent to one of ordinary skill in the art having the benefit of the instant disclosure. Therefore, the invention lies in the claims hereinafter appended.

What is claimed is:

1. A method of detecting errors in a computer using a flight recorder resident in the computer, the flight recorder configured to log trace data for one or more instrumented software entities resident in the computer in response to specific points in executable program code for the one or more instrumented software entities being reached, the method comprising:

executing the one or more instrumented software entities by the computer to issue work requests to a removable media system of the computer that provides an interface to one or more removable storage devices;

with the flight recorder, and in response to calls to the flight recorder from the one or more instrumented software entities, logging trace data for the one or more instrumented software entities during operational use of the computer, wherein the flight recorder is configured to log trace data associated with the work requests issued to the removable media system, wherein the logged trace data comprises a plurality of logged trace points, and wherein each logged trace point in the plurality of logged trace points is associated with a work request issued to the removable media system;

with the flight recorder, detecting a trend in the logged trace data, wherein detecting the trend includes detecting a plurality of trace points in the logged trace data associated with a first work request among the work requests issued to the removable media system;

with the flight recorder, determining an error associated with the first work request based on the detected trend in the logged trace data; and with the flight recorder, asserting an exception and terminating the first work request in response to determining the error such that availability of the removable media system is restored without having to perform a manual reboot for the removable media system.

2. The method of claim 1, wherein the logged trace data comprises a plurality of logged trace points.

3. The method of claim 2, wherein detecting the trend includes detecting a plurality of trace points in the logged trace data that meet a trend criterion.

4. The method of claim 3, wherein each logged trace point in the plurality of logged trace points includes a trace point identifier, and wherein detecting the plurality of trace points in the logged trace data that meet the trend criterion includes detecting a plurality of consecutive trace points having the same trace point identifier.

5. The method of claim 3, wherein each logged trace point in the plurality of logged trace points is associated with an operation, and wherein detecting the plurality of trace points in the logged trace data that meet the trend criterion includes detecting a plurality of consecutive trace points associated with the same operation.

6. The method of claim 5, wherein each logged trace point in the plurality of logged trace points includes an operation identifier, wherein detecting the plurality of consecutive trace points associated with the same operation includes detecting a plurality of consecutive trace points having the same operation identifier.

7. The method of claim 6, wherein the operation identifier for each logged trace point in the plurality of logged trace points includes a major operation identifier and a minor operation identifier, wherein detecting the plurality of consecutive trace points having the same operation identifier includes detecting a plurality of consecutive trace points having the same major operation identifier.

8. The method of claim 7, wherein detecting the plurality of consecutive trace points having the same operation identifier further includes detecting that the plurality of consecutive trace points having the same operation identifier have the same major and minor operation identifiers.

9. The method of claim 3, wherein each logged trace point in the plurality of logged trace points is associated with an instrumented software entity from among the one or more instrumented software entities in the computer, and wherein detecting the plurality of trace points in the logged trace data that meet the trend criterion includes detecting a plurality of consecutive trace points associated with the same instrumented software entity.

10. The method of claim 9, wherein each of the one or more instrumented software entities comprises a task, and wherein detecting the plurality of consecutive trace points associated with the same instrumented software entity comprises detecting a plurality of consecutive trace points associated with the same task.

11. The method of claim 9, wherein each of the one or more instrumented software entities is identified by an entity identifier, wherein each logged trace point in the plurality of logged trace points includes an entity identifier, and wherein detecting the plurality of consecutive trace points associated with the same instrumented software entity comprises detecting a plurality of consecutive trace points having the same entity identifier.

12. The method of claim 3, wherein detecting the plurality of trace points in the logged trace data that meet the trend criterion includes detecting a plurality of trace points matching a predetermined pattern.

13. The method of claim 3, wherein determining the error includes determining that the detected plurality of logged trace points meeting the trend criterion meet an error criterion.

14. The method of claim 13, wherein detecting the trend includes counting a number of logged trace points that meet the trend criterion, and wherein determining that the detected plurality of logged trace points meeting the trend criterion meet the error criterion includes comparing the number of logged trace points that meet the trend criterion against an error threshold value.

15. The method of claim 1, further comprising logging the error with the flight recorder in response to determining the error.

16. The method of claim 3, wherein detecting the plurality of trace points in the logged trace data that meet the trend criterion includes detecting a plurality of consecutive trace points in the logged trace data having a same characteristic.

17. The method of claim 16, wherein:
logging the trace data during operational use of the computer includes, in response to a call from an instrumented software entity among the one or more instrumented software entities to the flight recorder:
  logging a trace point;
  determining whether the logged trace point has the same characteristic as a prior logged trace point;
  if the logged trace point has the same characteristic as the prior logged trace point, incrementing a counter; and
  if the logged trace point does not have the same characteristic as the prior logged trace point, resetting the counter; and
determining the error includes determining that the detected plurality of logged trace points meeting the trend criterion meet an error criterion by comparing the counter with an error threshold value.

* * * * *